May 14, 1968 — M. SCOTT — 3,383,142
SPLIT BEARING STRUCTURE
Filed Aug. 16, 1965
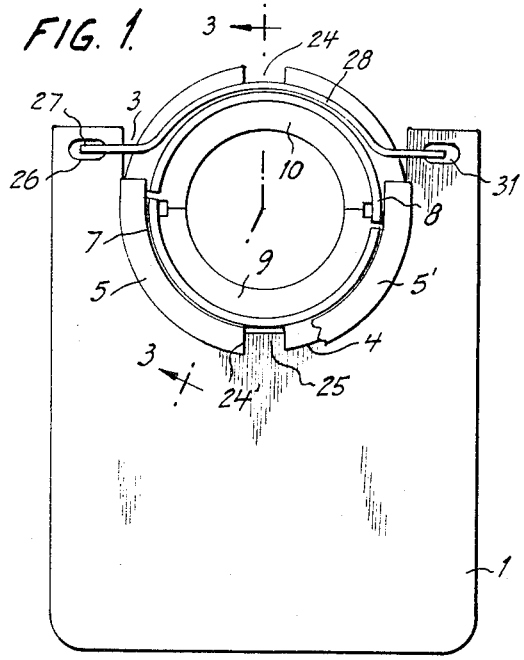
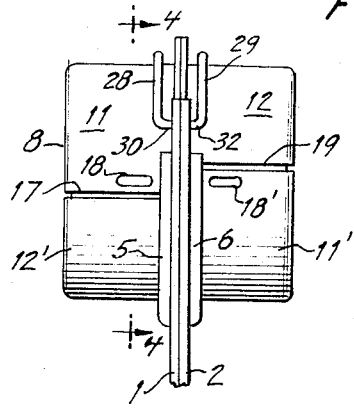
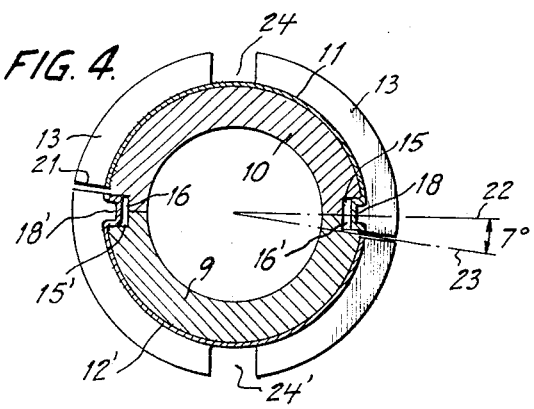
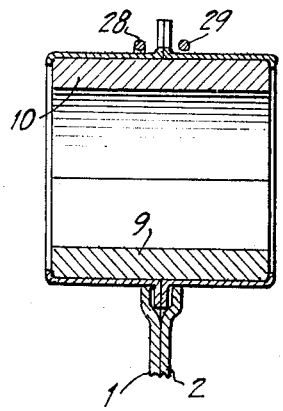
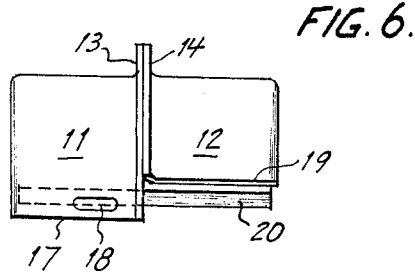
INVENTOR.
MARTIN SCOTT
BY Beerman & Beerman
ATTORNEYS United States Patent Office 3,383,142
Patented May 14, 1968

3,383,142
SPLIT BEARING STRUCTURE
Martin Scott, Valhalla, N.Y., assignor to The Metallized Carbon Co., Inc., a corporation of New York
Filed Aug. 16, 1965, Ser. No. 479,741
11 Claims. (Cl. 308—15)

ABSTRACT OF THE DISCLOSURE

A split bearing structure comprising split bearing means and shroud mounted on a base, the bearings and shroud being removable without disturbing the shafting or any associated elements.

---

The present invention is directed to bearings and more particularly to structures which can be replaced or removed without disturbing the shafting.

In many arrangements of shafting and bearing the spaces involved are rather confined. Since the bearings are subject to wear and they have to be replaced, it often becomes necessary, in order to replace a bearing, to dismantle the shafting to gain access to the bearing. This is not only time consuming involving much labor, but also it disrupts operations in the premises causing loss of production.

The present invention is adapted and intended to overcome the difficulty in replacing bearings, it being among the objects of the invention to provide a structure of bearing which will enable one to remove the bearing from its hanger or support without disturbing the shafting or any associated elements.

It is also among the objects of the invention to provide a structure of the above character which will enable one to remove a bearing by a simple manipulation and to replace it without consuming any substantial amount of time.

In practicing the invention, a support or hanger or base is provided in the nature of a relatively flat plate having a concave recess at one end, usually the upper end, and a split shroud carrying a split bearing is held in a channel at the lower edge of the concavity. Means are provided to prevent the halves of the split members from being accidentally displaced. A simple latch arrangement holds the bearing firmly in its support. By the present structure, the latch may be released, the upper half of the bearing raised a fraction of an inch, whereby it is released, and the half may be raised further or, if there is insufficient space, the half may be slid horizontally and removed. Then the lower half of the bearing may be raised to free it from the channel and it may be slid horizontally. Or the two halves together may be manipulated similarly. The new right bearing is then inserted into the base or support and the latch moved into locking position.

Other features of the invention include a shroud within which the bearing is held. The shroud has means for anchoring it onto the base, preferably by a tongue and slot arrangement. The bearing is provided at the meeting faces of its halves with grooves and indentations are formed in the halves of the shroud which fit into the grooves. Thereby both the shroud and the bearing are held against accidental rotation relative to the base.

To hold the structures together, a wire of spring material and doubled on itself serves as a latch. The base of the latch is pivoted in a suitable opening at the top of the base at one side, and the face end thereof is held in a similar opening at the opposite ends. The intermediate portion of the wire is arcuate and the two legs thereof embrace an upstanding flange on the shroud. The ends of the wire are bent at right angles and they enter the opening from opposite sides. This arrangement has the advantage that the bearing is held firmly in its proper position but at the same time, since the wire is of spring material, it will allow some movement due to shock or vibration, and the elasticity will cause the bearing to assume its proper position when the vibration ceases.

The invention is more fully described in connection with the accompanying drawing constituting a part hereof, and in which like reference characters indicate the parts, and in which FIGURE 1 is a front elevational view of a split bearing structure made in accordance with the present invention;

FIGURE 2 is a side elevational view thereof looking from the left of FIGURE 1;

FIGURE 3 is a transverse cross-sectional view taken along lines 3—3 of FIGURE 1;

FIGURE 4 is a longitudinal cross-sectional view taken along line 4—4 of FIGURE 2;

FIGURE 5 is an end elevational view of one half of the shroud and the bearing held therein; and FIGURE 6 is a side elevational view of the shroud half shown in FIGURE 5.

The base consists of a pair of plates 1 and 2 welded together. Top 3 thereof is open and a concavity 4 is formed therein. Each of the plates is offset outwardly at 5 and 6 to provide a channel. A shroud has semi-cylindrical halves 7 and 8 together forming a circle in which the halves 9 and 10 of a metallized carbon bearing is fitted.

As shown in FIGURES 5 and 6 each half of the shroud consists of two parts, 11 and 12, each having a flange 13 and 14, the flange being welded together. The structure of the two parts is complementary. Carbon bearing 10 has longitudinal recesses 15 and 16, and when the two halves of the bearing are fitted together they form a groove as shown in FIGURE 4. Along edge 17 of part 11 is an elongated indentation 18, the opposite edge 19 of part 12 is shorter than the other edge 17. On the other end of the shroud half the edge 20 of part 12 extends beyond the edge 21 of part 11 and an indentation is formed in the extending portion of part 11. As shown in FIGURE 4, the plane 22 of the meeting faces of the halves of the bearing and the plane 23 of meeting faces of the halves of the shroud are at a small angle to each other of the order of 7°. The complementary half of the shroud is indicated by numerals 11' and 12'.

In the flanges of the shroud halves are notches 24 and 24' at diametrically opposite points. A projection 25 is provided in the base by the offsetting of the plates to form the channel, the projection being the flat part between 5 and 5' of the channel. Notch 24 or 24' is adapted to be fitted over projection 25 to prevent relative rotation of the shroud relative to the base.

Indentations 18 and 18' extend into the grooves formed by recesses 15 and 16' and recesses 15' and 16, so that the bearing is prevented from rotation relative to the shroud.

When the two halves of the shroud are assembled on the base as shown in FIGURE 1, they are latched together. In opening 25 there is threaded looped end 27 of a wire having substantially parallel legs 28 and 29. End 30 of leg 28 is bent at right angles and enters hole 31. Similarly, end 32 of leg 29 enters hole 31 from the opposite sides of the base. The intermediate portions of legs 28 and 29 embrace the flange of the shroud and, being of spring steel, they firmly hold the shroud onto the base and in the channel thereof.

What is claimed is:

1. A split bearing structure comprising a substantially flat base, a substantially semi-cylindrical recess in one end thereof, a channel in said recess, a cylindrical shroud split transversely into two semi-cylindrical halves and having a peripheral flange, said flange mounted in said channel, a cylindrical bearing split transversely into two semi-cylindrical halves held in said shroud, cooperating means comprising a projection and notch in one or the other of said base and flange for holding said shroud from rotation relative to said base, at least one longitudinal recess at the junction of said two bearing halves and an indentation on said shroud entering said recess for holding said bearing from rotation relative to said shroud, and means attached to the upper end of said base bridging the top of said semi-cylindrical recess holding said shroud against upward displacement.

2. A split bearing according to claim 1 characterized in that said cooperating means on said base and shroud includes a projection in said channel cooperating with a slot in said flange.

3. A split bearing according to claim 1 characterized in that said cooperating means on said base and shroud includes a projection in said channel cooperating with a slot in said flange, said channel being notched opposite said projection.

4. A split bearing according to claim 1 characterized in that said bridging means includes a latch at the top of said base holds said shroud in position against accidental displacement.

5. A split bearing according to claim 1 characterized in that said bridging means includes a latch at the top of said base and holds said shroud in position against accidental displacement, said latch is pivoted at one side, embraces said flange, and latches into the other side of said base.

6. A split bearing according to claim 1 characterized in that an indentation is formed adjacent one edge of one half of said shroud and a corresponding indentation is formed adjacent to the corresponding edge of the other half of said shroud, said indentations being substantially diametrically opposite and entering said recesses in said bearing halves.

7. A split bearing according to claim 6 characterized in that a pair of alined indentations are formed in each of said halves of said shroud.

8. A split bearing according to claim 1 characterized in that a plane at the meeting faces of the halves of said bearing is at an acute angle to the plane at the meeting faces of said shroud.

9. A split bearing according to claim 1 characterized in that each of said shroud halves is in two parts, each having a flange, the flanges being integrally united, a notch is formed adjacent one edge of one half of said shroud and a corresponding notch is formed adjacent to the corresponding edge of the other half of said shroud and diametrically opposite therefrom.

10. A split bearing according to claim 5 characterized in that said latch is a U-shaped wire, the center thereof being pivoted on said base and the free end thereof being held in a keeper on said base.

11. A split bearing according to claim 10, characterized in that said acute angle is about 7°.

References Cited

UNITED STATES PATENTS

| | | | |
|---|---|---|---|
| 2,354,966 | 8/1944 | Jadoch | 308—74 X |
| 2,706,137 | 4/1955 | Stricklen | 308—201 |
| 2,738,687 | 3/1956 | Meile | 308—74 X |
| 2,741,933 | 4/1956 | Seitz | 308—74 X |
| 2,819,932 | 1/1958 | Walker | 308—29 |
| 2,992,049 | 7/1961 | Siebert | 308—27 |
| 3,022,126 | 2/1962 | Siebert | 308—237 |
| 3,054,646 | 9/1962 | Minor | 308—4 |
| 3,236,570 | 2/1966 | Satterthwaite | 307—74 X |

FOREIGN PATENTS 701,465   12/1940   Germany.

OTHER REFERENCES

Hanger Blaving Assemblies DS 509; Graphite. Metallizing Corporation, Yonkers, N.Y., Copyright 1957.

MARTIN P. SCHWADRON, *Primary Examiner.*

L. L. JOHNSON, *Assistant Examiner.*